June 11, 1957   B. F. PARR ET AL   2,795,183
COOKING APPARATUS
Filed Dec. 16, 1954   3 Sheets-Sheet 1
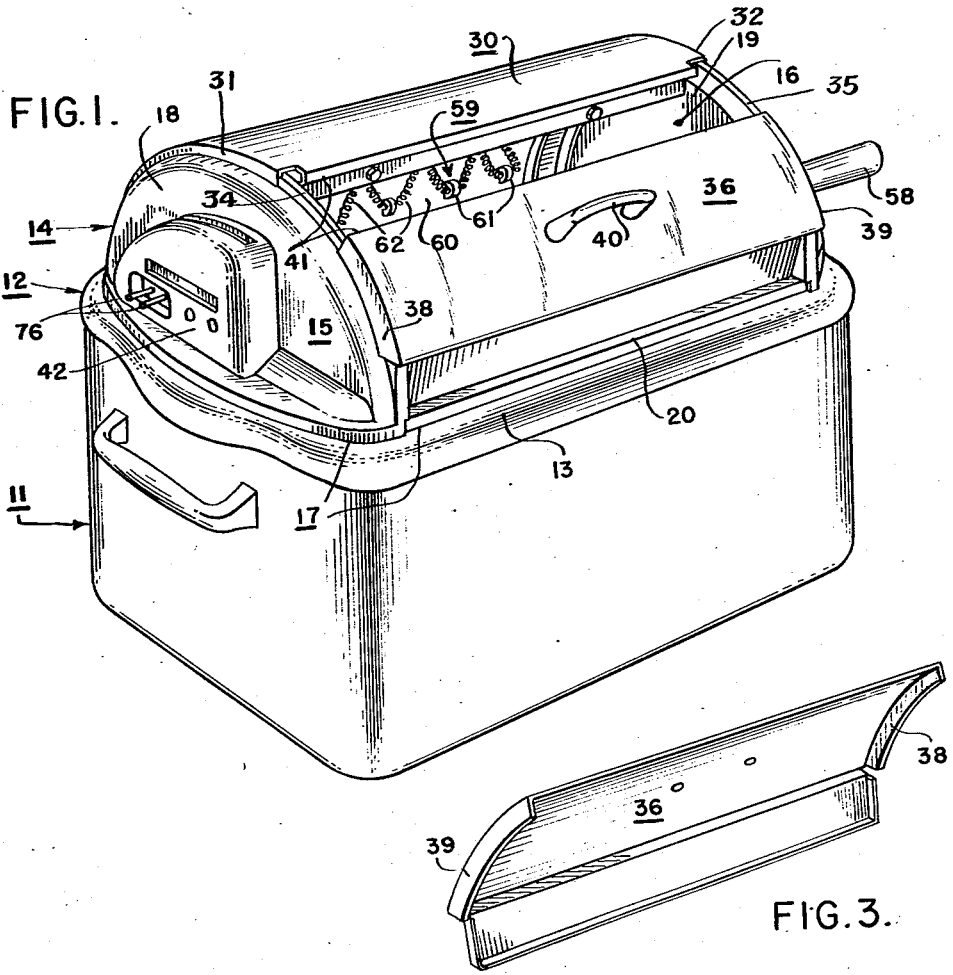
INVENTORS
BERNARD F. PARR
FREDERICK W. PERL
BY Roy H. Emrell
ATTORNEY

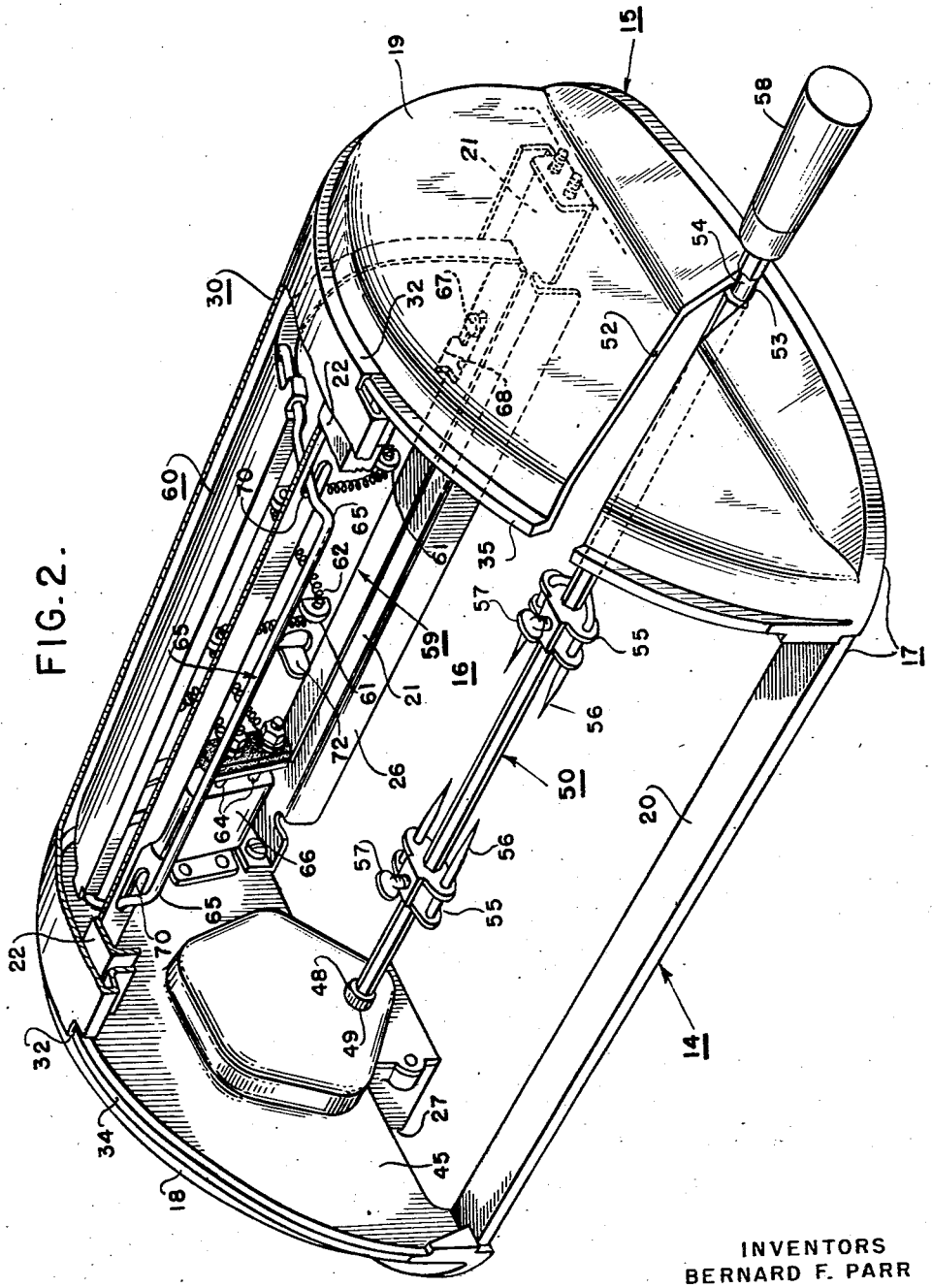

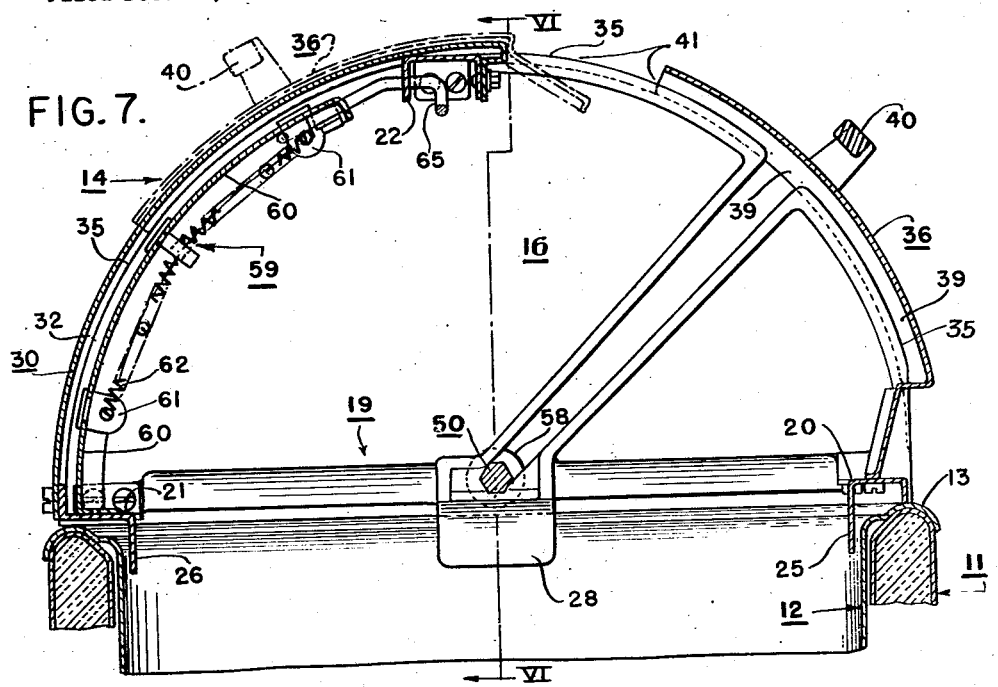
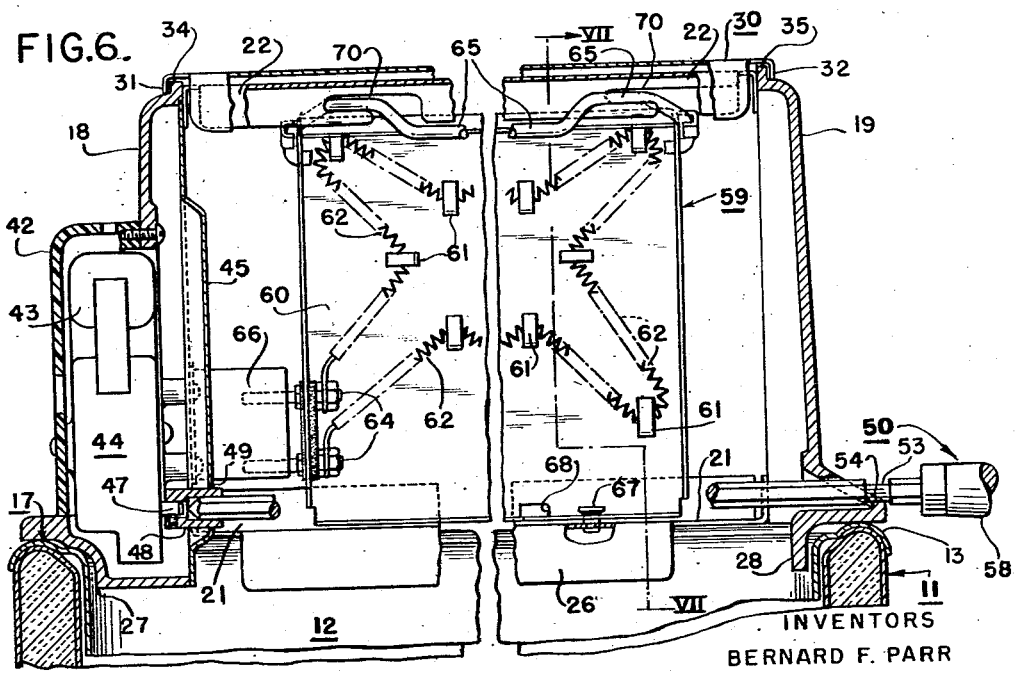

United States Patent Office 2,795,183
Patented June 11, 1957

2,795,183
COOKING APPARATUS

Bernard F. Parr and Frederick Walter Perl, Mansfield, Ohio, assignors to Westinghouse Electric Corporation, East Pittsburgh, Pa., a corporation of Pennsylvania Application December 16, 1954, Serial No. 475,684

3 Claims. (Cl. 99—421)

This invention relates to a roasting attachment designed for use with a deep rectangular pan, particularly of the type used in a domestic portable food roaster.

It is an object of this invention to provide a roasting attachment of the type set forth and enclosing a space complemental to the space in the pan supporting the attachment for forming a roasting chamber.

It is another object of the invention to provide a roasting attachment that is compact to facilitate storage thereof.

A further object of this invention is to provide a novel roasting attachment including a rotatable food holder, readily removable from the attachment and an electric heater for roasting food on said support and also removable from the attachment.

In practicing the invention, a generally semi-cylindrical, open-bottom casing is provided enclosing a space complemental to the space in a roasting pan for defining a roasting chamber at times when the attachment is placed upon the pan. A rotatable food supporting member or spit is journaled within the semi-cylindrical casing and preferably coaxially with respect thereto. Motor driven means carried by the casing is provided for rotating the spit, and an electric heater is removably supported within the casing for radiantly heating the food being prepared. Means is provided for readily detaching the spit from the motor driven means and from the casing. A portion of the casing structure is movable for gaining access to the roasting chamber at will.

The foregoing and other objects are effected by the invention as will be apparent from the following description taken in connection with the accompanying drawings, forming a part of this application, in which:

Fig. 1 is a perspective view showing a roasting attachment mounted on an inset pan in an electric roaster;

Fig. 2 is a perspective view showing the roasting attachment with a movable cover portion removed and a fixed portion of its casing partially cut away;

Fig. 3 is a perspective view showing the inside of the movable cover portion;

Fig. 4 is a perspective view of a plug-in heater removed from the roasting attachment;

Fig. 5 is a perspective view of the removable spit;

Fig. 6 is a vertical section taken along a central longitudinal plane of the roasting attachment as indicated by line VI—VI of Fig. 7; and Fig. 7 is a vertical section taken along the line VII—VII of Fig. 6.

Referring to Figs. 1 and 7, there appears a domestic food roaster 11 of a well known type including a removable inset pan 12 provided with a flanged rim 13. Supported on this rim is a roasting attachment 14 constructed and arranged in accordance with the present invention and having a generally semi-cylindrical open-bottom casing 15 defining with the pan 12 a roasting or cooking chamber 16.

The food roaster 11 contains a heating element (not shown) in its walls, which element is normally energized when this appliance is used as a simple oven. However, when the food roaster is used in combination with the roasting attachment 14, as seen in Fig. 1, the roaster 11 serves primarily as a base for the attachment and the roaster heater may be deenergized.

The casing 15 comprises a collar or frame 17 of generally rectangular shape and having a lower surface engageable with the rim 13 of the pan. The frame 17 comprises the lower portions of two substantially semi-circular end walls 18 and 19 and a pair of bracing members 20 and 21 extending therebetween at the lower front and rear sides of the casing, respectively. A third bracing member 22 extends between, and has its ends attached to, the upper center portions of the end walls 18 and 19.

Means are provided on the frame 17 of the casing 15 to engage the inner side walls of the pan 12 to prevent the roasting attachment 14 from sliding horizontally off the pan 12, but to permit removal therefrom. These means comprise depending members 25 and 26 on bracing members 20 and 21 and depending members 27 and 28 on the end walls 18 and 19, respectively.

The cover of the casing comprises a fixed arcuate portion 30 attached at its sides to the bracing members 21 and 22 and having flanges 31 and 32 at its ends overlying raised ribs 34 and 35 on the end walls 18 and 19. The movable front portion of the cover comprises an arcuate member 36 having a heat reflecting inner face and a slightly greater radius of curvature than the fixed cover portion 30. The cover member 36 is provided with flanges 38 and 39 overlying the ribs 34 and 35 to guide it during its sliding arcuate movement over the arcuate cover portion 30 between the open and closed positions indicated by the dotted and full lines, respectively, in Fig. 7. The movable cover member 36 may be provided with a handle 40 to facilitate sliding it on the end walls or lifting it therefrom.

The fixed cover portion 30 extends through an arc of approximately 90° between the bracing members 21 and 22, whereas the front or movable cover portion 36 extends through a lesser arc. When the movable cover portion 36 is in its closed position with its lower edge resting upon the front bracing member 20, there will be an opening 41 between these two cover portions as seen in Figs. 1 and 7. This opening 41 extends along the length of the roasting chamber 16 and provides for the escape of hot air therefrom. By letting the hot air escape, the cooking operation may be carried out primarily by direct and reflected radiant heat.

The left end wall 18 has attached thereto a thermally insulating phenolic shell 42 forming the outer wall of a motor housing supported by the frame 17. Secured to the inner side of the shell 42 is a motor 43 and a speed change mechanism 44 driven by the motor 43. Attached to the inner side of the end wall 18 is a baffle 45 forming the inner wall of the motor housing to shield the motor 43 and speed change mechanism 44 from the heat and vapors in the roasting chamber 16. Ventilating openings are provided in the shell 42 to help keep the motor 43 cool.

Means for supporting and rotating a food holder or spit 50 comprises an output shaft 47 of the speed change mechanism having fixed to the end thereof a rotatable drive member 48. The latter extends opposite the lower center portion of the left end wall 18 through an opening 49 in the baffle 45 and into the roasting chamber 16 to engage the spit 50. The shaft of the spit 50 is preferably hexagonal in cross section and one end thereof is received in a hexagonal recess in the rotatable member 48.

The end wall 19 is provided with a radially extending slot 52 open at its outer end and terminating at its inner end near the lower center portion of the end wall 19 in a bearing surface 53 for supporting the other end of the spit 50. The spit shaft has a reduced section 54 journalled in the bearing 53. The sides of this reduced section straddle the bearing to prevent the spit from moving axially and becoming disengaged from the rotatable drive member 48 during a roasting operation. The slot 52 and bearing 53 permit easy insertion and removal of the spit 50 through the access opening that is uncovered between the rear cover 30 and the frame 17 when the cover portion 36 is removed or slid to the dotted line position of Fig. 7.

It is to be particularly noted that the drive shaft 47 and the rotatable member 48 together with the bearing 53 position the spit for rotation about an axis which is substantially coaxial with the axis of the semi-cylindrical casing 15. Thus the spit 50 will lie near the center of the frame 17 substantially in or parallel and closely adjacent to the plane of the pan-rim-engaging surface. This enables the roasting attachment 15 to be made very compact and facilitates its storage.

Supported on the spit 50 are two food securing members 55 having opposed prongs 56 which engage the food and prevent it from rotating with respect to the spit when the latter is rotated continuously during a cooking operation. These members 55 are adjustable axially of the spit and are provided with thumb screws 57 to anchor them in their adjusted positions on the spit. The outer end of the spit is provided with a handle 58 which is preferably of insulating material to facilitate handling at the end of the cooking operation when both the spit and the food thereon are at high temperatures.

A removable or plug-in electric heater 59 for the roaster attachment is shown in Fig. 4 and comprises an arcuate heat reflecting plate 60 on which are mounted a plurality of insulating members 61 for supporting a coiled resistance heating element 62. The ends of the heating element 62 are connected to male terminal members 64 supported at one end of the reflecting plate 60 and insulated therefrom. A bent wire handle 65 extends along one side of the reflecting plate 60 and is attached to the opposite ends thereof.

When the heater is mounted within the roasting attachment as shown in Figs. 2 and 6, the male terminal members 64 are received in a female electric connector socket 66 which is mounted near the lower rear of the end wall 18. The lower right end of the reflector 60 is held in place by a rivet 67 attached to the bracing member 21. This rivet 67 extends into an L-shaped slot 68 in the reflector. The wire handle 65 passes through a pair of open-ended slots 70 in the bracing member 22 to hold the upper portion of the heater 59 in fixed position. The central portion of the wire handle 65 may be grasped to remove the plug-in heater 59 and also to carry it after removal. A tab 72 is formed from the reflecting plate 60 to assist in pulling the male members 64 from the female connector 66.

It may be seen from Figs. 2 and 6 that when the heater is moved to the right, the wire member 65 will be disengaged from the slots 70, the rivet 67 will be disengaged from the L-shaped slot 68 and the male terminal members 64 will be separated from the female connector 66. Thus, the heater 59 may be readily removed. Similarly, the heater 59 may be attached to the casing 15 by properly positioning the wire handle 65, the L-shaped slot 68 and the heater terminals 64 with respect to the casing 15 and then moving the heater 59 to the left.

As seen in Fig. 1, the roasting attachment 14 is provided with a pair of male electric terminals 76 adapted to be connected to a suitable power source by means of a conventional electric appliance power cord (not shown). The terminals 76 are suitably connected electrically to the electric motor 45 and to the fixed connector or socket 66 into which the heater 59 is plugged. When the power cord is connected to the terminals 76 and to a power source, the motor 43 will operate to drive the spit 50, and the heater element 62 will be energized.

Although the roasting attachment 15 is shown mounted directly on the rim of the inset pan 12, it may be mounted on the rim of the roaster 11 without the inset pan in place, or it may be mounted on any similarly shaped rectangular pan.

This roasting attachment will provide the features of many of the portable roasting devices now available on the market, but it is substantially smaller than the size of most such devices having the same food capacity. Since the food rotates during a cooking operation, the food size is limited by the radial distance between the spit and the closest side of the roasting chamber. Accordingly, this invention takes advantage of its generally semi-cylindrical shape to reduce its overall size. The unused upper corners of the familiar box-shaped roasting device have been eliminated.

While the invention has been shown in but one form, it will be obvious to those skilled in the art that it is not so limited, but is susceptible of various changes and modifications without departing from the spirit thereof.

What we claim is:

1. A roasting attachment adapted for mounting on the rim of a substantially rectangular roasting pan, said attachment comprising a generally rectangular frame having a surface engageable with the rim of the pan, a cover means supported by the frame to define with said pan, when mounted thereon, a roasting chamber, a motor supported on said frame, a rotatable spit, spit driving means on one end of said frame including a rotatable member driven by said motor, one end of said spit being supported and rotatably driven by said member, a bearing carried by the opposite end of said frame for supporting the other end of said spit, said rotatable member and said bearing positioning the axis of the spit adjacent the center of the frame and the plane of said surface, said cover means comprising a first portion fixed on said frame and a second portion supported on said frame and movable with respect thereto to provide access to said chamber for insertion and removal of said spit, an electric heating element supported adjacent the inner wall of said fixed cover portion and pan engaging means comprising depending members on the under side of said frame to limit transverse sliding movement of said frame relative said pan and to permit removal of said frame from the pan.

2. A roasting attachment for mounting on the rim of a substantially rectangular roasting pan, said attachment comprising a generally rectangular frame having a surface engageable with the rim of said pan, a cover means on said frame defining with said pan, when mounted thereon, a roasting chamber, a motor supported by said frame, a rotatable food holder, means for supporting one end of said food holder on one end of said frame, said means including a rotatable member driven by said motor for rotating said food holder, a bearing carried by the opposite end of said frame for supporting the other end of said holder, said supporting means and said bearing positioning said holder with its axis of rotation near the center of said frame and substantially parallel and adjacent to the plane of said surface, said cover means comprising a first arcuate portion fixed on said frame, said attachment having an access opening to said chamber between the first cover portion and said frame, a second arcuate cover portion being supported on said frame to close at least a portion of said opening and movable thereon to a position overlying said fixed cover portion to uncover said access opening for insertion and removal of said food holder, an electric heating element supported adjacent the inner wall of said fixed cover portion, and pan engaging means on said frame to prevent said attachment from sliding horizontally off said pan and to permit removal of said attachment from said pan.

3. A roasting attachment for mounting on the rim of a substantially rectangular roasting pan, said attachment comprising a generally semi-cylindrical open-bottom casing having a surface engageable with the rim of said pan, said casing defining with said pan, when mounted thereon, a roasting chamber, a motor supported by said casing, a rotatable spit, means carried by one end of said casing for supporting one end of said spit, and means including a rotatable member driven by said motor for rotating said spit, a bearing carried by the opposite end of said casing for supporting the other end of said spit, said means and said bearing positioning said spit with its axis of rotation adjacent the plane of said surface substantially co-incident with the axis of said casing, an electric heating element supported adjacent the inner wall of a relatively fixed portion of said semi-cylindrical casing, a second portion of said casing being movable to provide an access opening to said chamber for insertion and removal of the spit, and pan engaging means comprising depending members on the under side of said casing being so constructed and adapted as to prevent said device from sliding horizontally off said pan and to permit it to be lifted therefrom.

References Cited in the file of this patent

UNITED STATES PATENTS

| | | |
|---|---|---|
| 1,541,472 | Born | June 9, 1925 |
| 1,666,394 | Miglin | Apr. 17, 1928 |
| 2,160,953 | Berbeles | June 6, 1939 |
| 2,320,304 | Rosset | May 25, 1943 |
| 2,428,839 | DiSalino | Oct. 14, 1947 |